United States Patent

Ogura et al.

[11] Patent Number: 5,985,966
[45] Date of Patent: *Nov. 16, 1999

[54] AQUEOUS EMULSION OF FLUORINE-CONTAINING POLYMER

[75] Inventors: Masatsune Ogura, Ichikawa; Shizuo Chiba, Shimizu, both of Japan

[73] Assignee: Du Pont - Mitsui Fluorochemicals Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/600,980

[22] PCT Filed: Jul. 3, 1995

[86] PCT No.: PCT/JP95/01323

§ 371 Date: Feb. 16, 1996

§ 102(e) Date: Feb. 16, 1996

[87] PCT Pub. No.: WO96/01871

PCT Pub. Date: Jan. 25, 1996

[30] Foreign Application Priority Data

Jul. 11, 1994 [JP] Japan .................................. 6-180479

[51] Int. Cl.$^6$ .................................................. C08J 5/42
[52] U.S. Cl. ........................ 524/161; 524/368; 524/370; 524/546

[58] Field of Search ..................................... 524/161, 368, 524/370, 546

[56] References Cited

U.S. PATENT DOCUMENTS 4,329,268 5/1982 Chakrabarti et al. .................... 524/166

FOREIGN PATENT DOCUMENTS

| 0 026 932 | 4/1981 | European Pat. Off. . |
| 2 078 077 | 5/1971 | France . |
| 2 137 701 | 12/1972 | France . |
| 2 126 950 | 11/1972 | Germany . |
| 2 306 940 | 8/1974 | Germany . |
| 1069364 | 5/1967 | United Kingdom . |
| 1 391 610 | 4/1975 | United Kingdom . |

*Primary Examiner*—Peter D. Mulcahy
*Attorney, Agent, or Firm*—Pillsbury Madison & Sutro

[57] ABSTRACT

An aqueous emulsion of fluorine-containing polymer according to the present invention contains an emulsion stabilizer represented by the formula:

$$R\text{---}Ph\text{---}O\text{---}(CH_2CH_2O)_n\text{---}CH_2CH_2\text{---}SO_3M$$

(Ph is a phenyl radical; R is an alkyl radical having 8–12 carbon atoms; n is a number of 1–6; and M is Na, K or $NH_4$). The resulting emulsion has excellent mechanical stabilities and thermal stabilities as well as decreased possibility of causing ground water contamination.

5 Claims, No Drawings

AQUEOUS EMULSION OF FLUORINE-CONTAINING POLYMER

This application claims benefit of international application PCT/ JP95 /01323 filed Jul. 3, 1995.

TECHNICAL FIELD

The present invention relates to a novel aqueous emulsion of fluorine-containing polymer having excellent mechanical stability and thermal stability.

BACKGROUND ART

Aqueous emulsions of polytetrafluoroethylene (hereinafter referred to as PTFE) are prepared by the emulsion-polymerization method disclosed in the U.S. Pat. No. 2,559,752. Aqueous emulsions of other fluorine-containing polymers are also prepared by using similar process. Aqueous emulsions of fluorine-containing polymer thus prepared have being employed as coating agents for metals or the like, impregnating agents for fibers and cloths, additives for various materials, and further as dust-preventive treating agents. For adaptation to these uses, the emulsion is generally stabilized with such nonionic surfactants as p-$C_{8-10}$ alkylphenylpolyethyleneglycolethers, as the emulsion itself is inferior in mechanical stability. However, even thus stabilized emulsions become unstable against thermal and mechanical actions they encounter during evaporation, concentration, dilution, transportation, weighing and others.

It is an object of the present invention to provide an aqueous emulsion of fluorine-containing polymer having excellent mechanical stability. By use of the inventive emulsion, for example, preventions become feasible for such problems caused by inferior mechanical stability as clogging of pumps, valves and nozzles with coagulated colloidal particles of fluorine-containing polymers formed during agitation, transportation and spraying, adhesion of coagulated particles to container walls and agitators, and flotation of coagulated particles in the emulsion.

It is another object of the present invention to provide an aqueous emulsion of fluorine-containing polymer having excellent thermal stability. By use of the inventive emulsion, for example, preventions become feasible for such problems caused by inferior thermal stability as deteriorated coating property and impregnation property towards metal, glass woven fabric owing to increased emulsion viscosities under high temperatures.

It is a further object of the present invention to provide an aqueous emulsion of fluorine-containing polymer having reduced environmental pollutions especially in the ground water pollution. By use of the inventive emulsion, for example, preventions become feasible for such problems as pollution of ground water caused by emulsion stabilizers in the emulsion occurring when materials treated with PTFE emulsions are used for mixing with soil or filling in the ground for reclamation. Moreover, the inventive emulsion allows concentration by evaporation or dilution thereof, thanks to its increased mechanical and thermal stabilities.

DISCLOSURE OF THE INVENTION

An aqueous emulsion of fluorine-containing polymer according to the present invention is characterized by that it contains an emulsion stabilizer represented by the formula:

in which Ph is a phenyl radical, R is a $C_8$–$C_{12}$ alkyl radical, n is a number of 1–6, and M is Na, K or $NH_4$.

The emulsion stabilizer is added preferably not less than 1 wt % to the polymer.

BEST MODE FOR CARRYING OUT THE INVENTION

In the present invention, the fluorine-containing polymer includes polymers of tetrafluoroethylene, chlorotrifluoroethylene or vinylidenefluoride, or copolymers containing the aforementioned. Mention is made of the polymers including polytetrafluoroethylene, tetrafluoroethylene.hexafluoropropylene copolymer, tetrafluoroethylene.fluoroalkylvinylether copolymer, tetrafluoroethylene.ethylene copolymer, polychlorotrifluoroethylene, polyvinylidenefluoride and vinylidenefluoride.hexafluoropropylene copolymer.

In the present invention, the aqueous emulsion means those containing in water 1–75 wt % of the fluorine-containing polymer in colloidal particles having an average particle size of 0.1–0.3μ. The average particle size of colloidal particles is measured by the centrifugal sedimentation method. In Examples and Comparative Examples of the present invention, the values were measured by use of a centrifugal sedimentation particle size distribution measuring equipment (SA-CP4L; Shimadzu Corp.).

As for the emulsion stabilizer, those having the formula

are used. In the formula, Ph denotes a phenyl radical, R denotes an alkyl radical having 8–12 carbon atoms being preferably an octyl radical or a nonyl radical, and n for the oxyethylene radical denotes a number of 1–6 being preferably 1–3. When n is larger than 6, excessive hydrophilic properties decrease the emulsifying efficiency to result in the aqueous emulsion of fluorine-containing polymer having inferior mechanical stability and decreased thermal stabilities caused by enhanced effects of the oxyethylene radical. M is selected from Na, K and $NH_4$ being preferably Na due to the resulting solubility to water. The amount of emulsion stabilizer contained is not less than 1.0 wt % per fluorine-containing polymer weight preferably being in a range of 1.5–5 wt %. When the amount added is less than 1.0 wt %, the emulsion tends to become unstable. No upper limit exists for the amount to be added, however, over 10 wt % is uneconomical and thus less than 5 wt % is preferred. The amount of emulsion stabilizer in the present emulsion can be reduced to ½–⅓ of the amount of conventional emulsion stabilizer p-nonylphenylpolyethyleneglycolether.

The mechanical stability of the aqueous emulsion of fluorine-containing polymer can be assessed by observation of increased ratio of apparent sizes of associated colloidal particles resulting from collisions of particles in the emulsion during high speed agitation of the emulsion. Further, under agitation, the colloidal particles coagulate partly to form a coagulum, which may adhere to agitator rotors, vessel walls and others, or isolate from the emulsion as a flock. Under occurrence of these phenomenon, the emulsion is regarded as having an inferior stability, despite of the increase or decrease in size of colloidal particles remaining in the emulsion. In the present invention, the mechanical stability is assessed by increased ratio of particle size measured according to the following method. Into a beaker of 60 mm inner diameter is charged 200 ml of an emulsion having an average particle size ($S_1$). An agitator (ULTRA-TURRAX; JUNKE & KUNKEL GMBH & Co. KG) having a shaft with a generator is so disposed in the beaker as the shaft is apart by 15 mm from the bottom of beaker and deviates by 5 mm from the center, and the agitator is operated for 5 minutes under 20,500 rpm. The average particle size ($S_2$) of emulsion after being subjected to the agitation is measured, and the increased ratio of particle size is calculated according to the following formula:

Increased ratio of particle size (%)=($S_2$-$S_1$)/$S_1$×100

The mechanical stability is rated under the following standard:

Good: Increased ratio of particle size is >0%–<5%;
Fair: Increased ratio of particle size is ≧5%–<10%; and
Poor: Increased ratio of particle size is ≧10%.

In addition to the above, Poor is rated when a large amount of coagulated matter is formed by the agitation.

Viscosity of the aqueous emulsion increases in accordance with increase in the temperature of emulsion. Unfavorable emulsions show sharp increase in viscosity at temperatures the emulsion encounter when stored in summer, during usages or concentration by evaporation. In the Example and Comparative Example of the present invention, the viscosity was measured at 20–60° C. for aqueous emulsions containing about 60 wt % fluorine-containing polymer by use of a B-Type viscometer (Type BL; Tokyo Keiki). Emulsions showing vigorous increases in viscosity at 30–60° C. are recognized as having poor thermal stability.

EXAMPLES 1, 2 AND COMPARATIVE EXAMPLE 1

To aqueous emulsions containing about 45 wt % PTFE prepared by the controlled emulsion polymerization method (the emulsion is hereinafter referred to as feed stock) were added respectively 2.2 wt % per PTFE of the emulsion stabilizers mentioned in Table 1. Under gentle agitation, water was added to obtain aqueous emulsions A, B and C containing about 30 wt % PTFE.

TABLE 1

| Sample | Kind of Emulsion Stabilizer |
|---|---|
| A | $C_8H_{17}$—Ph—O—$CH_2CH_2O$—$CH_2CH_2SO_3Na$ |
| B | $C_8H_{17}$—Ph—O—$(CH_2CH_2O)_2$—$CH_2CH_2SO_3Na$ |
| C | $C_9H_{19}$—Ph—O—$(CH_2CH_2O)_9$—$CH_2CH_2OH$ |

Mechanical stability test: The increased ratio of particle size measured with the aforementioned method for Samples A, B and C is shown in Table 2. By comparison with Sample C (Comparative Example 1) using the conventional emulsion stabilizer p-nonylphenylpolyethyleneglycolether, Sample A (Example 1) and Sample B (Example 2) added with the emulsion stabilizer of the present invention showed better mechanical stability.

TABLE 2

| Example | Sample | Average Particle Size, before Agitation | Average Particle Size, after Agitation | Increased Ratio of Particle Size | Mechanical Stability |
|---|---|---|---|---|---|
| Example 1 | A | 0.261μ | 0.265μ | 1.5% | Good |
| Example 2 | B | 0.261μ | 0.263μ | 0.8% | Good |
| Comparative Example 1 | C | 0.247μ | 0.279μ | 13.0% | Poor |

EXAMPLE 3 AND COMPARATIVE EXAMPLES 2 and 3

Evaporating concentration test: Samples D, E and F were prepared by adding to the feed stock respectively 3.5 wt % per PTFE weight of the emulsion stabilizer shown in Table 3. The sample was subject to evaporating concentration under atmospheric pressure in a round bottom flask put on a 150 W mantle heater. Sample D (Example 3) was concentrated to obtain a 60 wt % PTFE aqueous emulsion though bubbling occurred. Sample E (Comparative Example 2) was impossible to be concentrated due to formation of a large amount of agllomerate. Sample F (Comparative Example 3) was impossible to be concentrated due to occurrence of vigorous bubbling.

TABLE 3

| Sample | Kind of Emulsion Stabilizer |
|---|---|
| D | $C_8H_{17}$—Ph—O—$(CH_2CH_2O)_2$—$CH_2CH_2SO_3Na$ |
| E | $C_9H_{19}$—Ph—O—$(CH_2CH_2O)_9$—$CH_2CH_2OH$ |
| F | $C_9H_{19}$—Ph—$SO_3Na$ |

EXAMPLE 4 AND COMPARATIVE EXAMPLE 4

Thermal stability test: The thermal stability test was conducted against a 60 wt % PTFE aqueous emulsion obtained in Example 3 as Sample D (Example 4) and a 60 wt % PTFE aqueous emulsion Sample G (Comparative Example 4) prepared by use of 6.1 wt % per PTFE of p-nonylphenylpolyethyleneglycolether (n=9) and concentration method according to the U.S. Pat. No. 3,037,953. The result obtained is shown in Table 4. The viscosity of Sample D increased gradually in accordance with increase in temperature, but that of Sample G increased rapidly between 40° C. and 60° C.

TABLE 4

| Example No. | Sample | Viscosity cP | | | | | Thermal Stability |
|---|---|---|---|---|---|---|---|
| | | 20° C. | 30° C. | 40° C. | 50° C. | 60° C. | |
| Example 4 | D | 21.5 | 25.5 | 25.5 | 31.5 | 34.0 | Good |
| Comparative Example 4 | G | 22.5 | 21.5 | 22.5 | 56.0 | 97.0 | Poor |

EXAMPLE 5 AND COMPARATIVE EXAMPLE 5

Environmental pollution test: Sample B and Sample C each were diluted with pure water to adjust the concentration of emulsion stabilizer in the emulsion to 100 ppm. Into a 200 ml beaker was placed 50 ml of the diluted Sample, 5 g of $Ca(OH)_2$ was added, agitated slowly for 1 hour with a 4 cm magnetic stirrer, decanted and the concentration of emulsion stabilizer in the supernatant liquid was measured. The concentration of emulsion stabilizer in the supernatant liquid of Sample B (Example 5) was 0, but that of Sample C (Comparative Example 5) was 1000 ppm.

INDUSTRIAL APPLICATION

An aqueous emulsion of fluorine-containing polymer according to the present invention has superior mechanical stability and thermal stability as well as decreased possibility of causing ground water pollution in comparison with those emulsions using a conventional emulsion stabilizer p-nonylphenylpolyethyleneglycolether.

What is claimed is:

1. An aqueous emulsion comprising:
    a fluorine-containing polymer, which is a homopolymer of monomer selected from the group consisting of tetrafluoroethylene, chlorotrifluoroethylene and vinylidenefluoride, or a copolymer of said monomer, said aqueous emulsion being prepared by emulsion-polymerization of said monomer; and said emulsion further comprises an emulsion stabilizer represented by the formula:

$$R-Ph-O-(CH_2CH_2O)_n-CH_2CH_2-SO_3M$$

in which Ph is a phenyl radical, R is an alkyl radical having 8–12 carbon atoms, n is a number of 1–6, and M is Na, K or $NH_4$, wherein said stabilizer is added after the emulsion-polymerization of said monomer.

2. The aqueous emulsion according to claim 1, in which said emulsion contains not less than 1 wt % of the emulsion stabilizer per the weight of polymer.

3. An aqueous emulsion according to claim 1, in which the fluorine-containing polymer is polytetrafluoroethylene.

4. An aqueous emulsion according to claim 1, in which the aqueous emulsion contains 1.5–5 wt % of the emulsion stabilizer per the weight of the polymer.

5. An aqueous emulsion according to claim 1, in which the aqueous emulsion contains 1–75 wt % of the fluorine-containing polymer in colloidal particles having average particle size of 0.1–0.3$\mu$.

* * * * *